(12) United States Patent
Laufer et al.

(10) Patent No.: US 9,540,480 B2
(45) Date of Patent: Jan. 10, 2017

(54) USE OF CARBODIIMIDE-CONTAINING COMPOSITIONS FOR CONTROLLING POT LIFE

(71) Applicant: Rhein Chemie Rheinau GmbH, Mannheim (DE)

(72) Inventors: Wilhelm Laufer, Ellerstadt (DE); Uwe Haas, Wernau/N. (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 14/398,333

(22) PCT Filed: Mar. 22, 2013

(86) PCT No.: PCT/EP2013/056156
§ 371 (c)(1),
(2) Date: Oct. 31, 2014

(87) PCT Pub. No.: WO2013/164136
PCT Pub. Date: Nov. 7, 2013

(65) Prior Publication Data
US 2015/0133624 A1 May 14, 2015

(30) Foreign Application Priority Data
May 3, 2012 (EP) .................................. 12166635

(51) Int. Cl.
| | | |
|---|---|---|
| *C08G 18/76* | (2006.01) | |
| *C08G 18/38* | (2006.01) | |
| *C08G 18/32* | (2006.01) | |
| *C08G 18/66* | (2006.01) | |
| *C08G 18/75* | (2006.01) | |
| *C08G 18/79* | (2006.01) | |
| *C08G 18/02* | (2006.01) | |
| *C08G 18/10* | (2006.01) | |
| *C08G 18/28* | (2006.01) | |
| *C08G 18/42* | (2006.01) | |
| *C08K 5/29* | (2006.01) | |

(52) U.S. Cl.
CPC ......... *C08G 18/7621* (2013.01); *C08G 18/025* (2013.01); *C08G 18/10* (2013.01); *C08G 18/283* (2013.01); *C08G 18/3221* (2013.01); *C08G 18/3821* (2013.01); *C08G 18/42* (2013.01); *C08G 18/4238* (2013.01); *C08G 18/664* (2013.01); *C08G 18/758* (2013.01); *C08G 18/7671* (2013.01); *C08G 18/797* (2013.01); *C08K 5/29* (2013.01)

(58) Field of Classification Search
None
See application file for complete search history.

(56) References Cited

U.S. PATENT DOCUMENTS

| | | | | |
|---|---|---|---|---|
| 6,153,718 A | * | 11/2000 | Imashiro | C08G 18/025 528/67 |
| 6,248,819 B1 | * | 6/2001 | Masuda | B05D 5/068 524/195 |
| 7,439,316 B2 | * | 10/2008 | Hesselmans | C08G 18/283 524/589 |
| 8,604,154 B2 | | 12/2013 | Takahashi et al. | |
| 2006/0003085 A1 | | 1/2006 | Takahashi et al. | |
| 2009/0234074 A1 | | 9/2009 | Segawa et al. | |
| 2010/0144980 A1 | | 6/2010 | Fujibayshi et al. | |

FOREIGN PATENT DOCUMENTS

| | | |
|---|---|---|
| EP | 0792909 A1 | 9/1997 |
| EP | 0850985 A1 | 7/1998 |
| JP | 09255752 | 9/1997 |

OTHER PUBLICATIONS

Derwent English abstract for JP 2000128956 A, May 9, 2000.*
International Search Report from International Application No. PCT/EP2013/056156 dated Jun. 17, 2013, three pages.

* cited by examiner

*Primary Examiner* — Jeffrey Washville

(57) ABSTRACT

The invention relates to the use of carbodiimide-containing compositions for controlling pot life in the production of polyurethane (PU)-based systems, preferably PU elastomers, PU adhesives, PU casting resins or PU foams.

15 Claims, No Drawings

USE OF CARBODIIMIDE-CONTAINING COMPOSITIONS FOR CONTROLLING POT LIFE

The invention relates to the use of carbodiimide-containing compositions for controlling pot life in the production of polyurethane (PU)-based systems, preferably PU elastomers, PU adhesives, PU casting resins or PU foams.

Polyurethanes form through polyaddition or polycondensation reaction of polyisocyanates with polyhydric alcohols, the polyols, in a virtually quantitative manner. The linkage arises through the reaction of an isocyanate group (—N=C=O) of one molecule with a hydroxyl group (—OH) of another molecule to form a urethane group (—N—CO—O—).

The course of the reaction between diisocyanate and polyol is dependent on the molar ratio of the components. Intermediates having desirable average molecular weight and desirable end groups may quite possibly be obtained. These intermediates can then be reacted (chain-extended) with a diol or diamine at a later juncture, in which case the desired polyurethane or polyurethane-polyurea hybrid is formed. The intermediates are generally referred to as prepolymers.

Suitable polyols for the production of prepolymers are, as well as the diols, also polyalkylene glycol ethers, polyether esters or polyesters having terminal hydroxyl groups (polyester polyols).

For the preparation of mechanically or dynamically durable polyurethanes, it is preferable to use polyester polyols.

The polyether esters or polyesters having terminal hydroxyl groups, prepared by polycondensation of simple diols and carboxylic acids, still contain free carboxylic acids. These catalyze the reaction between the free isocyanate groups present in the prepolymer and the diamine required for the chain extension, which leads to short pot lives and makes the reaction uncontrollable. In addition, these frequently have a low hydrolysis stability.

The carbodiimides currently available on the market, as described in EP-A 0799843, are too slow to react for rapid acid degradation in the time allowed for the preparation of prepolymers, or are unusable and uneconomic because of excessively low solubility.

It was therefore an object of the present invention to provide compositions suitable for the production of polyurethane (PU)-based systems, especially for the production of elastomers, PU adhesives or PU casting resins or PU foams, which are producible in hydrolysis-stable form and in an economically viable manner, and which have an acceptable pot life without requiring materials that are costly and difficult to prepare.

This object was surprisingly achieved by the use of particular carbodiimide-containing compositions.

The present invention therefore provides for the use of compositions for controlling pot life, comprising
at least one polyol and
at least one carbodiimide of the formula (I)

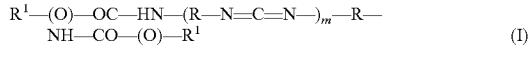

with m=1 to 40,

R is $C_6$-$C_{18}$-alkylene or $C_6$-$C_{18}$-cycloalkylene, preferably

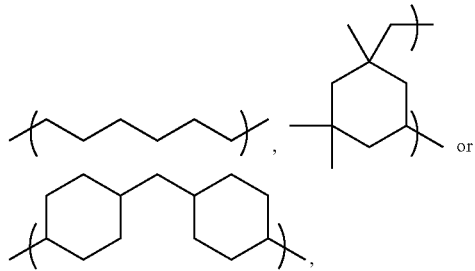

$R^1$ is $C_1$-$C_4$-alkyl or else a —$(CH_2)_h$—O—[$(CH_2)_k$—O]$_g$—$R^2$ radical,
with h=1-3, k=1-3, g=5-20 and $R^2$ is H or $C_1$-$C_4$-alkyl, preferably $CH_3$.

In a further preferred embodiment of the invention, the carbodiimide used is a compound of the formula (I) in which
m=10-30,
R is $C_6$-$C_{18}$-alkylene or $C_6$-$C_{18}$-cycloalkylene, preferably

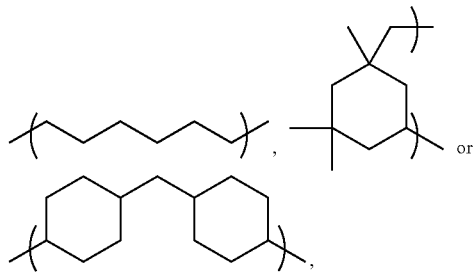

$R^1$ is $C_1$-$C_4$-alkyl or a —$(CH_2)_h$—O—[$(CH_2)_k$—O]$_g$—$R^2$ radical,
with h=1-3, k=1-3, g=10-12 and $R^2$=H or $C_1$-$C_4$-alkyl, preferably $CH_3$.

In a further, particularly preferred embodiment of the invention, the carbodiimide of the formula (I) is a compound in which
m=20,
R is defined as $C_6$-$C_{18}$-alkylene or $C_6$-$C_{18}$-cycloalkylene, preferably

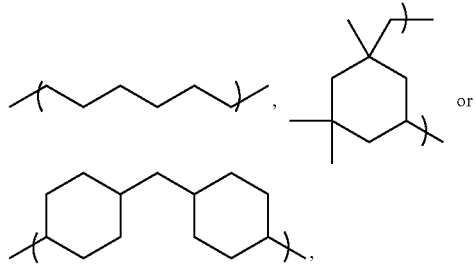

$R^1$ is a —$(CH_2)_h$—O—[$(CH_2)_k$—O]$_g$—$R^2$ radical,
with h=2, k=2, g=10-12, and $R^2$ is $CH_3$.

Preferably, R has the same definition within the carbodiimide of the formula (I).

The compounds of the formula (I) are commodity chemicals available, for example, from Rhein Chemie Rheinau GmbH, for example under the Stabaxol®, Hycasyl® trade name.

Preference is likewise given to mixtures of a plurality of carbodiimides of the formula (I). In the case of a mixture, the determination of the average value for m may also result in fractions.

The polyols in the context of the invention are compounds that preferably have a molecular weight in (g/mol) of up to 2000, preferably in the range from 500 to 2000 and more preferably in the range from 500 to 1000.

The term "polyol" in the context of the invention encompasses both compounds having two or three hydroxyl groups per molecule and compounds having more than three hydroxyl groups per molecule.

Preferred polyols are polyester polyols and/or polyester ester polyols, more preferably polyester polyols.

It is advantageous when the polyol has an OH number of up to 200, preferably between 20 and 150 and more preferably between 50 and 115.

Especially suitable are polyester polyols which are reaction products of various diols with aromatic or aliphatic dicarboxylic acids and/or polymers of lactones.

Preference is given here to aromatic dicarboxylic acids, which can be used for formation of suitable polyester polyols. Particular preference is given here to terephthalic acid, isophthalic acid, phthalic acid, phthalic anhydride, and substituted dicarboxylic acid compounds having a benzene ring.

Preferred aliphatic dicarboxylic acids are those which can be used for the formation of suitable polyester polyols, more preferably sebacic acid, adipic acid and glutaric acid.

Preferred polymers of lactones are those which can be used for the formation of suitable polyester polyols, more preferably polycaprolactone.

Both the dicarboxylic acids and the polymers of lactones are commodity chemicals.

Particular preference is also given to those diols that can be used for formation of suitable polyester polyols, most preferably ethylene glycol, butanediol, neopentyl glycol, hexanediol, propylene glycol, dipropylene glycol, diethylene glycol and cyclohexanedimethanol.

For this purpose, preference is given to the reaction products of various aforementioned polyols with aromatic or aliphatic dicarboxylic acids and/or polymers of lactones (e.g. polycaprolactone).

The polyols used in the context of the inventions are commodity chemicals available from Bayer MaterialScience AG under the Desmophen® trade name.

In a further embodiment of the invention, the composition additionally comprises at least one diisocyanate.

Preferred diisocyanates are aromatic and aliphatic diisocyanates. Particular preference is given to toluene 2,4-diisocyanate, toluene 2,6-diisocyanate, phenylene diisocyanate, 4,4-diphenylmethane diisocyanate, methylenebis(4-phenyl isocyanate), naphthalene 1,5-diisocyanate, tetramethylene diisocyanate and/or hexamethylene 1,6-diisocyanate, very particular preference to toluene 2,4-diisocyanate and toluene 2,6-diisocyanate.

The diisocyanates used in the context of the inventions are commodity chemicals available from Bayer MaterialScience AG under the Desmodur® trade name.

In a further embodiment of the invention, the composition additionally comprises at least one diamine.

Preferred diamines used for the chain extension are 2-methylpropyl 3,5-diamino-4-chlorobenzoate, bis(4,4'-amino-3-chlorophenyl)methane, 3,5-dimethylthio-2,4-tolylenediamine, 3,5-dimethylthio-2,4-tolylenediamine, 3,5-diethyl-2,4-tolylenediamine, 3,5-diethyl-2,6-tolylenediamine, 4,4'-methylenebis(3-chloro-2,6-diethylaniline) and 1,3-propanediol bis(4-aminobenzoate).

The diamines used in the context of the invention for chain extension are commodity chemicals available from Rheinchemie Rheinau GmbH under the Addolink® trade name.

The ratio of carbodiimide to polyol is preferably 0.1-5, more preferably 1-3, parts by weight per 100 parts by weight of polyol.

The ratio of diisocyanate to polyol is preferably 20 to 50:100 parts by weight, more preferably 30:100 parts by weight.

In the cases in which the composition comprises, as well as the polyol and the carbodiimide and the diisocyanate, additionally at least one diamine, the amount of diamine is 5-30% by weight, based on the composition.

The present invention additionally provides for the production of the inventive composition, in which the polyol is initially charged and the carbodiimide of formula (I) or a mixture of carbodiimides of formula (I) is stirred in.

In the cases in which the inventive mixture additionally comprises the diisocyanate, this is stirred into the composition composed of polyol and at least one carbodiimide of formula (I) at temperatures between 80 and 130° C.

In the cases in which the inventive mixture comprises, as well as the diisocyanate, additionally a diamine, this is stirred into the composition composed of polyol and at least one carbodiimide of formula (I) and diisocyanate at temperatures in the range from 40 and 130° C.

The above-described compositions are preferably used in PU elastomers, adhesives or casting resins for controlling pot life and/or as protection against hydrolytic degradation.

The scope of the invention includes all general radical definitions, indices, parameters and illustrations mentioned above and below, and those mentioned in preferred ranges with one another, i.e. also any combinations between the respective ranges and preferred ranges.

The examples which follow serve to illustrate the invention but have no limiting effect.

WORKING EXAMPLES

In the examples which follow, the following substances were used:

Desmophen® 2000MM, a linear polyester polyol having an OH number of 56 mg KOH/g and an acid number of 0.83 mg KOH/g, from Bayer MaterialScience AG.

A carbodiimide of the formula (I) having an average m of 20, $R^1$=—$(CH_2)_h$—O—$[(CH_2)_k$—O$]_g$—$R^2$ where $R^2$=methyl, H=2, k=2 and g=10-12.

Stabaxol®P200, a polymeric aromatic carbodiimide based on tetramethylxylene diisocyanate from Rhein Chemie Rheinau GmbH.

Stabaxol® I, a monomeric carbodiimide based on 2,6-diisopropylphenyl isocyanate from Rhein Chemie Rheinau GmbH.

Desmodur®T100, a tolylene 2,4-diisocyanate from Bayer Material Science.

Addolink® 1604, a 2-methylpropyl 3,5-diamino-4-chlorobenzoate from Rhein Chemie Rheinau GmbH as diamine component.

Carbodilite® HMV-8 CA: a polymeric aliphatic carbodiimide from Nisshinbo Industries, INC.

The following mixtures were prepared as follows:
Mixture A (Comparative):
100 g of Desmophen® 2000MZ were melted at 100° C.

Mixture B (Inventive):

100 g of Desmophen® 2000MZ were melted at 100° C. and admixed with 0.6 g of the carbodiimide of the formula (I) having an average m of 20, $R^1=\!\!-\!\!(CH_2)_h\!\!-\!\!O\!\!-\!\![(CH_2)_k\!\!-\!\!O]_g\!\!-\!\!R^2$ where $R^2$=methyl,

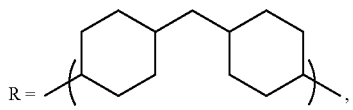

h=2, k=2 and g=10-12.

Mixture C (Comparative):

100 g of Desmophen® 2000MM were melted at 100° C. and admixed with 0.6 g of monomeric carbodiimide based on 2,6-diisopropylphenyl isocyanate.

Mixture D (Comparative):

100 g of Desmophen® 2000MM were admixed with 0.6 g of Carbodilite® HMV-8 CA and stored at 30° C. for 24 h. The two substances are immiscible. Thus, this mixture was unusable for further experiments.

All figures are in parts by weight, unless stated otherwise.

TABLE 1

| Parts/ Mixture no. | Mixture A | Mixture B | Mixture C | Desmodur® T100 | Addolink 1604 |
|---|---|---|---|---|---|
| I (C) | 100 | | | 21 | 16.16 |
| II (inv.) | | 100 | | 21 | 16.16 |
| III (C) | | | 100 | 21 | 16.16 |

C = comparative example,
inv. = inventive

Mixtures A to C were reacted at temperatures of 80° C. with the amounts of Desmodur® T 100 specified in table 2 up to an isocyanate content of 5%, and then reacted with the Addolink® 1604 chain extender in the with the amount specified in table 2. The pot life of the mixture which is still liquid, gelates after a few minutes and reacts to give a solid elastomer was determined. The pot life is the time between the mixing of a multicomponent substance and the end of processability. The values determined are shown in table 3.

TABLE 2

| Mixture | Pot life in seconds |
|---|---|
| I | 240 |
| II | 420 |
| III | 340 |

Interpretation of the Experimental Results:

It is clearly apparent from the value for mixture II that the mixture comprising the inventive carbodiimide of the formula (I) having an average m of 20, $R^1=\!\!-\!\!(CH_2)_h\!\!-\!\!O\!\!-\!\![(CH_2)_k\!\!-\!\!O]_g\!\!-\!\!R^2$ where $R^2$=methyl, l=2, k=2 and g=10-12, leads to a distinct extension of pot life and hence to an improvement in processability.

What is claimed is:

1. A method for controlling pot life of polyurethane-based systems having a polyol and a polyisocyanate that when mixed together have a defined polymerization pot life, the method comprising:

extending the pot life of the polyurethane-based system by separately mixing at least one of the polyol and the polyisocyanate with at least one carbodiimide of the formula (I)

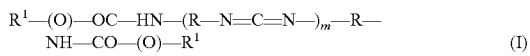

wherein:

m=1 to 40,

R is $C_6$-$C_{18}$-alkylene or $C_6$-$C_{18}$-cycoalkylene, and $R^1$ is $C_1$-$C_4$-alkyl or $-\!(CH_2)_h\!\!-\!\!O\!\!-\!\![(CH_2)_k\!\!-\!\!O]_g\!\!-\!\!R^2$, where h=1-3, k=1-3, g=5-20, and where $R^2$ is H or $C_1$-$C_4$-alkyl, at least prior to mixing of the polyol and the polyisocyanate to provide a polyurethane-based system having an extended pot life; and controlling the polymerization pot life by mixing the polyol, the polyisocyanate, and the at least one carbodiimide to begin polymerization and polymerizing the components over the extended pot life of at least 420 seconds.

2. The method of claim 1, wherein:

m=10-30,

R is $C_6$-$C_{18}$-alkylene or $C_6$-$C_{18}$-cycloalkylene, and $R^1$ is $C_1$-$C_4$-alkyl or a $-\!(CH_2)_h\!\!-\!\!O\!\!-\!\![(CH_2)_k\!\!-\!\!O]_g\!\!-\!\!R^2$ radical, with h=1-3, k=1-3, g=10-12, and where $R^2$ is H or $C_1$-$C_4$-alkyl.

3. The method of claim 1, wherein the at least one carbodiimide of the formula (I) is a mixture of a plurality of different carbodiimides of the formula (I).

4. The method of claim 1, wherein:

R is defined as:

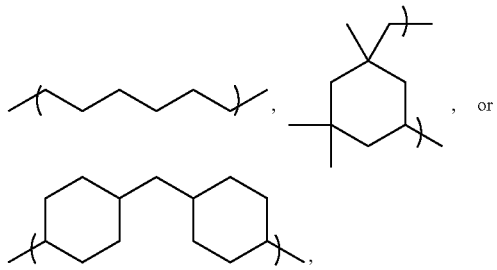

and $R^1$ is a $-\!(CH_2)_h\!\!-\!\!O\!\!-\!\![(CH_2)_k\!\!-\!\!O]_g\!\!-\!\!R^2$ radical, with h=1-3, k=1-3, g=5-20, and $R^2$ is H or $C_1$-$C_4$-alkyl.

5. The method of claim 1, wherein the carbodiimide of the formula (I) is mixed with the polyol prior to mixing the polyol and the polyisocyanate, and the polyol comprises polyester polyols, polyether ester polyols, or a combination thereof.

6. The method of claim 1, further comprising mixing each of the carbodiimide of the formula (I), the polyol, and the diisocyanate to produce a polyurethane mixture.

7. The method of claim 1, further comprising mixing at least one diamine with the carbodiimide of the formula (I) and the at least one of the polyol and the polyisocyanate at least prior to mixing of the polyol and the polyisocyanate.

8. The method of claim 6, wherein the diisocyanate is selected from the group consisting of toluene 2,4-diisocyanate, toluene 2,6-diisocyanate, phenylene diisocyanate, 4,4-diphenylmethane diisocyanate, methylenebis(4-phenyl isocyanate), naphthalene 1,5-diisocyanate, tetramethylene 1,4-diisocyanate, hexamethylene 1,6-diisocyanate, and mixtures thereof.

9. The method of claim 7, wherein the diamine is selected from the group consisting of 2-methylpropyl 3,5-diamino-4-chlorobenzoate, bis(4,4'-amino-3-chlorophenyl)methane, 3,5-dimethylthio-2,4-tolylenediamine, 3,5-dimethylthio-2, 4-tolylenediamine, 3,5-diethyl-2,4-tolylenediamine, 3,5-diethyl-2,6-tolylenediamine, 4,4'-methylenebis(3-chloro-2,6-diethylaniline), 1,3-propanediol bis(4-aminobenzoate), and mixtures thereof.

10. The method of claim 4, wherein:
M is 20; and
$R^1$ is a —$(CH_2)_h$—O—$[(CH_2)_k$—O$]_g$—$R^2$ radical, with h=2, k=2, g=10-12, and $R^2$ is $CH_3$.

11. The method of claim 1, wherein:
a ratio of carbodiimide to polyol is 0.1-5:100 parts by weight; and
a ratio of diisocyanate to polyol is 20 to 50:100 parts by weight.

12. The method of claim 11, wherein:
the carbodiimide of the formula (I) and a diamine are mixed with the polyol prior to mixing of the polyol and the polyisocyanate to form the polyurethane;
R is defined as:

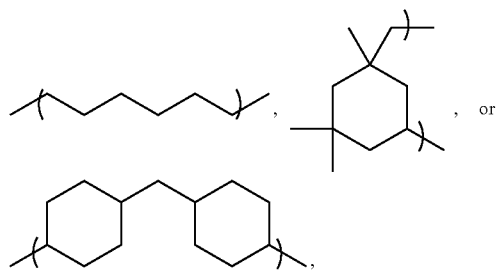

and
$R^1$ is a —$(CH_2)_h$—O—$[(CH_2)_k$—O$]_g$—$R^2$ radical, with h=1-3, k=1-3, g=5-20, and $R^2$ is H or $C_1$-$C_4$-alkyl;
the polyol comprises at least one polyol having a molecular weight of 500 to 1000 g/mol and an OH number of 50 to 115;
the diisocyanate is selected from the group consisting of toluene 2,4-diisocyanate, toluene 2,6-diisocyanate, phenylene diisocyanate, 4,4-diphenylmethane diisocyanate, methylenebis(4-phenyl isocyanate), naphthalene 1,5-diisocyanate, tetramethylene 1,4-diisocyanate, hexamethylene 1,6-diisocyanate, and mixtures thereof; and
the diamine is selected from the group consisting of 2-methylpropyl 3,5-diamino-4-chlorobenzoate, bis(4,4'-amino-3-chlorophenyl)methane, 3,5-dimethylthio-2,4-tolylenediamine, 3,5-dimethylthio-2,4-tolylenediamine, 3,5-diethyl-2,4-tolylenediamine, 3,5-diethyl-2,6-tolylenediamine, 4,4'-methylenebis(3-chloro-2,6-diethylaniline), 1,3-propanediol bis(4-aminobenzoate), and mixtures thereof.

13. The method of claim 12, wherein:
R is defined as:

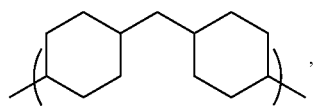

$R^1$ is a —$(CH_2)_h$—O—$[(CH_2)_k$—O$]_g$—$R^2$ radical, with h=2, k=2, g=10-12, and $R^2$ is methyl;
the polyol is polyester polyol, polyether ester polyol, or a combination thereof;
the diisocyanate is toluene 2,4-diisocyanate, toluene 2,6-diisocyanate, or a combination thereof;
the diamine is 2-methylpropyl 3,5-diamino-4-chlorobenzoate;
a ratio of the carbodiimide to the polyol is 1 to 3:100 parts by weight;
a ratio of the diisocyanate to the polyol is 30:100 parts by weight; and
the polyurethane comprises 5-30 wt % of the diamine.

14. The method of claim 1, wherein:
the at least one carbodiimide is separately mixed with the at least one of the polyol and the polyisocyanate prior to mixing of the polyol and the polyisocyanate, whereby the polyurethane-based system having an extended pot life comprises a first polyol component separate from a second polyisocyanate component, wherein at least one of the first polyol component and the second polyisocyanate component is mixed with the carbodiimide; and
the polymerizing comprises mixing the first polyol component with the second polyisocyanate component.

15. The method of claim 1, wherein:
the at least one carbodiimide is mixed with the polyol prior to mixing of the polyol and the polyisocyanate, whereby the polyurethane-based system having an extended pot life comprises the polyisocyanate separate from a polyol component comprising the polyol and the carbodiimide; and
the polymerizing comprises mixing the polyol component with the polyisocyanate.

* * * * *